United States Patent [19]

Mohan

[11] Patent Number: 5,380,143
[45] Date of Patent: Jan. 10, 1995

[54] LIGHTWEIGHT COMBINATION BOAT TRAILER AND LIFT

[76] Inventor: Philip Mohan, 5882 Hunters Gate, Troy, Mich. 48098

[21] Appl. No.: 32,302

[22] Filed: Mar. 17, 1993

[51] Int. Cl.$^6$ .............................................. B60P 3/10
[52] U.S. Cl. .................. 414/495; 280/414.1; 414/678; 414/786; 405/3; 114/48; 114/344
[58] Field of Search ............. 414/495, 474, 475, 476, 414/478; 254/4 R, 4 C, 418; 114/48, 44, 45, 51, 258, 259, 263, 344; 280/414.1; 187/9 R, 11 R, 21, 23; 405/1, 3

[56] References Cited

U.S. PATENT DOCUMENTS

| | | |
|---|---|---|
| 2,651,498 | 9/1953 | Straub . |
| 2,774,606 | 12/1956 | Burweger et al. . |
| 3,120,317 | 2/1964 | Pardonnet . |
| 3,124,259 | 3/1964 | Goetti . |
| 3,870,339 | 3/1975 | Goff . |
| 3,974,924 | 8/1976 | Ullman, Jr. . |
| 4,003,583 | 1/1977 | Stanzel . |
| 4,286,800 | 9/1981 | Lomas . |
| 4,318,632 | 3/1982 | Fortmeyer . |
| 4,589,814 | 5/1986 | Cates . |
| 4,773,346 | 9/1988 | Blanding et al. ................. 114/48 X |
| 4,779,888 | 10/1988 | Raymond . |
| 4,932,830 | 6/1990 | Woodburn . |
| 5,090,841 | 2/1992 | Penick, Jr. et al. ...................... 405/3 |
| 5,131,342 | 7/1992 | Sackett . |
| 5,163,378 | 11/1992 | Raymond ........................... 405/3 X |

FOREIGN PATENT DOCUMENTS

| | | |
|---|---|---|
| 571861 | 3/1959 | Canada . |
| 615271 | 2/1961 | Canada . |
| 370896 | 9/1963 | Switzerland ........................ 414/678 |
| 2133378A | 7/1984 | United Kingdom . |
| WO90/01432 | 2/1990 | United Kingdom . |

*Primary Examiner*—Frank E. Werner
*Attorney, Agent, or Firm*—Harness, Dickey & Pierce

[57] ABSTRACT

This invention relates to an apparatus and method for transporting a boat and elevating the boat above a body of water utilizing a lightweight combination boat trailer and lift. A lightweight support frame carries the boat during transporting and elevating. Positioning members attached to the lightweight support frame position the boat upon the lightweight support frame in a detachable manner. Three adjustable support legs are adjustably secured to the lightweight support frame. A cable and winch assembly is utilized for elevating the lightweight support frame and is connected to the adjustable support legs to simultaneously move the adjustable support legs in the same direction. This enables the lightweight support frame to be elevated to carry the boat above the body of water or lowered to carry the boat into the body of water. Once lowered into the water, the boat can float free from the lightweight support frame or enable the boat to maneuver the lightweight combination boat trailer and lift in a floatable manner about the body of water.

16 Claims, 4 Drawing Sheets

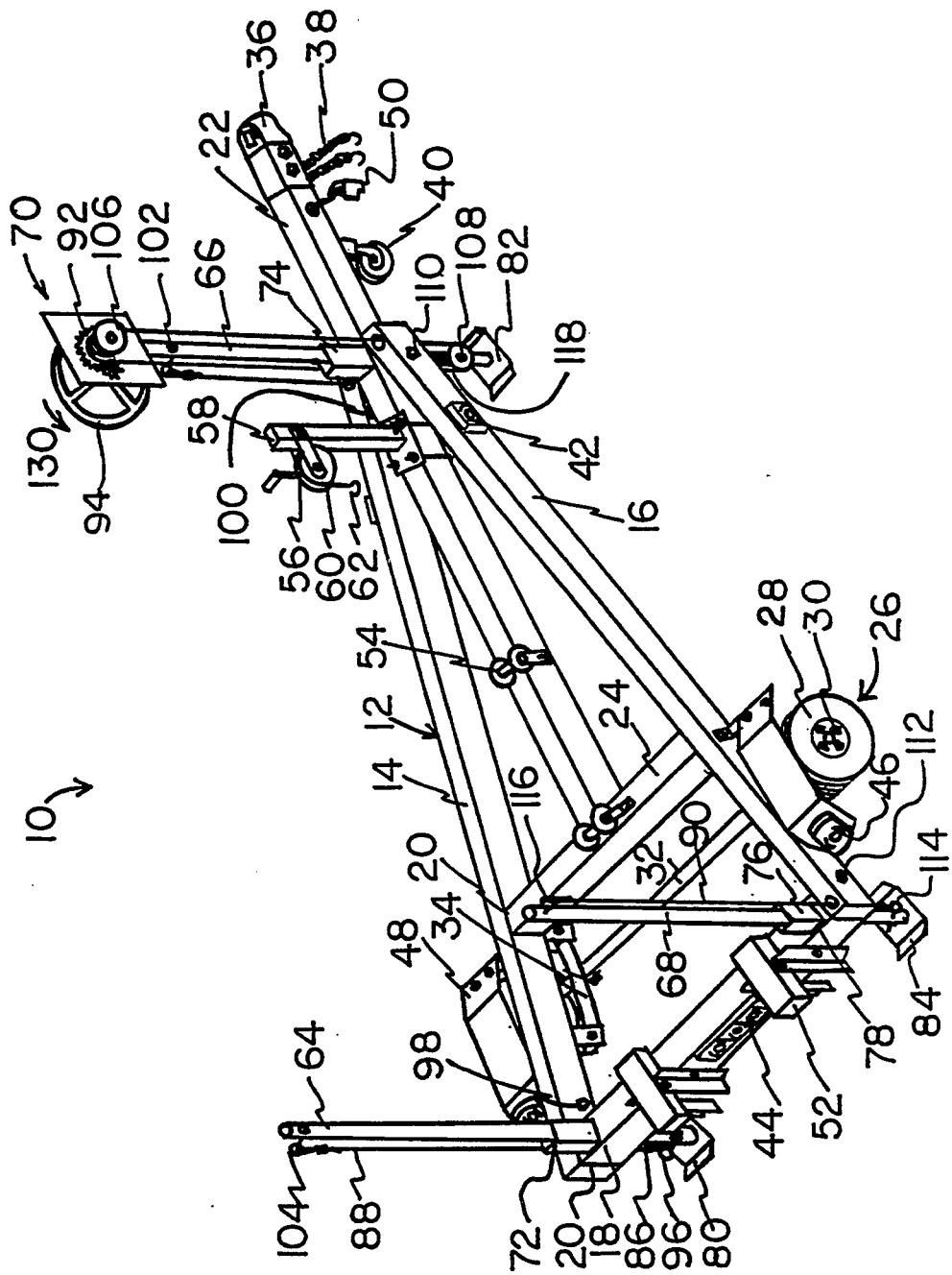

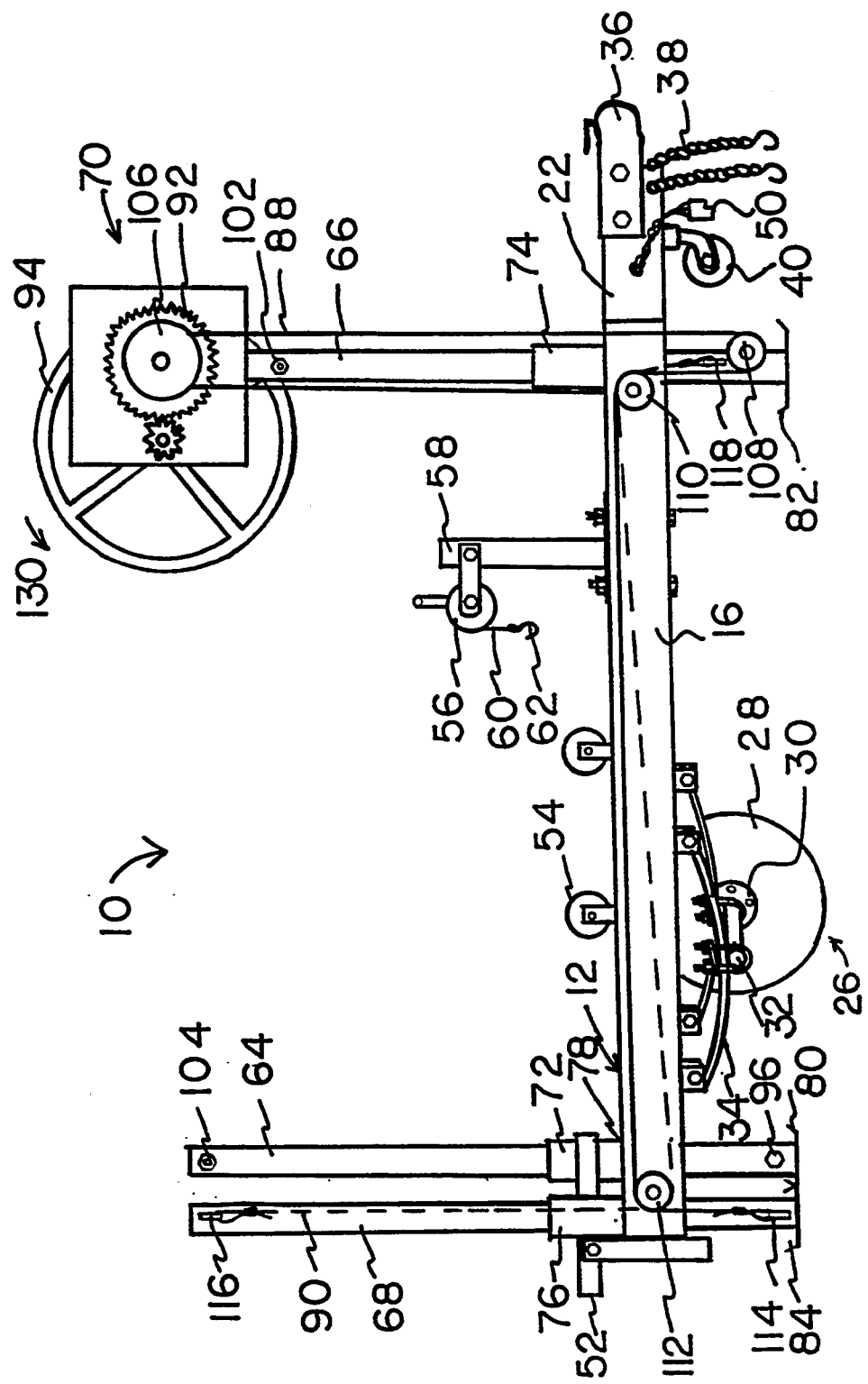

LIGHTWEIGHT COMBINATION BOAT TRAILER AND LIFT

BACKGROUND OF THE INVENTION

1. Field of the Invention

This invention relates generally to a combination trailer and lifting apparatus, and more particularly, to a lightweight combination boat trailer and lift for transporting a boat and elevating the boat above a body of water.

2. Discussion of the Related Art

Boat trailers are commonly known in the art for transporting a boat from one location to another by utilizing a towing vehicle. In addition, boat trailers are also employed to position the boat within a body of water in order to facilitate launching the boat. Once the boat is launched, the boat trailer has essentially served its purpose and is thereby removed from the water with the towing vehicle. This allows the boat trailer to be stored in an appropriate location until the boat trailer is once again needed to remove the boat from the water.

While the boat is situated in the body of water, it is particularly desirable to store the boat above the water in order to prevent the boat from becoming damaged by waves and also to maintain the cleanliness of the boat hull. To achieve these results, a boat lift is commonly employed to elevate the boat above the body of water for docking and storage. Thereafter, when it is desired to utilize the boat, the boat lift is lowered into the water, thereby allowing the boat to float free from the boat lift. After a boating season ends, and particularly in colder climates, the boat is once again removed from the body of water and stored on the boat trailer. This results in having to remove the boat lift from the water to store it on land in order to prevent the boat lift from becoming damaged or corroded.

Accordingly, one typically must maintain and store both a boat trailer and a boat lift in order to transport a boat and elevate the boat above a body of water for docking and storage. This results in not employing the boat trailer and having to store it when the boat is docked or stored on the boat lift. Furthermore, when the boat is stored on the boat trailer, the boat lift is typically removed from the body of water and also kept in storage. As a result, the cost of maintaining and storing a separate boat trailer and a boat lift is increased, as well as requiring a sufficient amount of storage space for both devices.

In addition, the process of removing the typical boat lift from the body of water, as well as positioning the boat lift at a suitable docking location is often difficult and requires more than one individual. This is particularly true where the shoreline consists of harsh and irregular terrain often encountered along most shorelines. Moreover, to make matters more difficult, the typical boat lift does not float, nor can the boat lift be maneuvered in a floatable manner in order to facilitate the process of positioning the boat lift at a suitable docking location.

What is needed then is a single lightweight combination boat trailer and lift which can transport a boat, elevate the boat above a body of water for docking and storage and capable of being maneuvered about the body of water in a floatable manner to facilitate positioning the combination boat trailer and lift at a suitable docking location. This will ultimately result in reducing the cost of having to maintain a separate boat trailer and a boat lift by combining them into a single device, while also alleviating the burden of having to store an unused boat trailer or boat lift. Moreover, the process of removing and positioning a combination boat trailer and lift which is capable of being maneuvered in a floatable manner will be much easier and require only one individual.

It is therefore an object of the present invention to provide a lightweight combination boat trailer and lift that can achieve these results.

SUMMARY OF THE INVENTION

In accordance with the present invention, a lightweight combination boat trailer and lift is employed to transport a boat and elevate the boat above a body of water. This is basically achieved by utilizing the combination boat trailer and lift to transport and position the boat within the body of water with a towing vehicle. The lightweight combination boat trailer and lift is then unhitched from the towing vehicle to enable the boat to maneuver the lightweight combination boat trailer and lift in a floatable manner to a suitable docking location. At this location, the boat is elevated and stored above the body of water.

In one preferred embodiment, a lightweight support frame carries the boat during transporting and elevating. The lightweight support frame includes positioning members to position the boat upon the frame such that the boat is detachably positioned on the lightweight support frame. Three adjustable support legs are adjustably secured to the lightweight support frame. A cable and winch assembly is utilized for elevating the lightweight support frame and is secured to the adjustable support legs to simultaneously move the adjustable support legs in the same direction. This ultimately enables the lightweight support frame to be elevated to carry the boat above the body of water or lowered to carry the boat into the body of water. Once the boat is lowered into the body of water, the boat can float free from the lightweight support frame or maneuver the lightweight combination boat trailer and lift in a floatable manner to a suitable docking location.

In another preferred embodiment, three adjustable support legs are adjustably secured to the lightweight support frame at pivot points and interlinked with one another with a first member and a second member. A cable and winch assembly is utilized for elevating the lightweight support frame and is secured to one adjustable support leg. This also results in simultaneously moving the adjustable support legs in the same direction to either elevate or lower the lightweight support frame.

Use of the present invention results in transporting a boat and elevating the boat above a body of water in an easy and cost effective manner. As a result, the aforementioned disadvantages associated with utilizing the currently available separate boat trailers and boat lifts have been substantially eliminated.

BRIEF DESCRIPTION OF THE DRAWINGS

Still other advantages of the present invention will become apparent to those skilled in the art after reading the following specifications and by reference to the drawings in which:

FIG. 1 is a perspective view of one preferred embodiment of the present invention;

FIG. 2 is a cross sectional side view of the embodiment of FIG. 1;

DETAILED DESCRIPTION OF THE PREFERRED EMBODIMENT

Figure 3A:
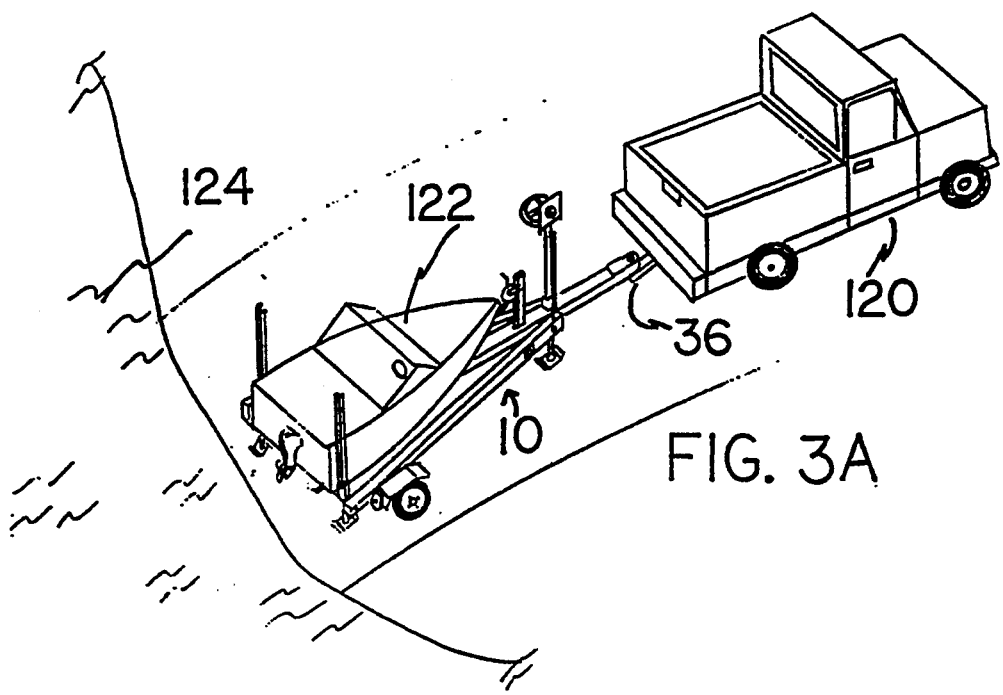
FIG. 3A is a perspective view of the embodiment of FIG. 1 shown connected to a towing vehicle and carrying a boat.

The following description of the preferred embodiment concerning a lightweight combination boat trailer and lift is merely exemplary in nature and is no way intended to limit the invention or its application of uses. Moreover, the present invention is described in detail below with reference to transporting and lifting a boat having a V-type hull, however, it will be appreciated by those skilled in the art that the present invention, as defined by the appended claims, is clearly not limited to transporting and elevating this particular type of boat or water craft.

Referring to FIGS. 1-3C, one preferred embodiment of a lightweight combination boat trailer and lift 10 is shown. The lightweight combination boat trailer and lift 10 includes a lightweight support frame 12, preferably constructed of aluminum or other lightweight material and having a substantially triangular shape. The lightweight support frame 12 consists of a first side frame member 14 and a second side frame member 16 secured together by a rear frame member 18, preferably by welded seams 20. A center frame member 22 is secured perpendicular to a cross frame member 24 and extends out the front of the lightweight support frame 12. The cross frame member 24 is secured to the first side frame member 14 and the second side frame member 16 also by welded seams 20.

An axle assembly 26 is rigidly secured to the lightweight support frame 12 to enable the lightweight combination boat trailer and lift 10 to be towed behind a towing vehicle (not shown in FIGS. 1 and 2). The axle assembly 26 is preferably a waterproof assembly typically used in the trailer industry having a pair of tires and wheels 28 bolted to hubs 30. The hubs 30 are secured to an axle 32 which is mounted underneath the lightweight support frame 12 by a pair of leaf springs 34, shown clearly in FIG. 2. The leaf springs 34 enable a boat (not shown in FIGS. 1 and 2) to be transported smoothly over various road surfaces.

A trailer hitch 36, preferably a ball mount type, is bolted to the center frame member 22 to allow the combination boat trailer and lift 10 to be coupled to the towing vehicle (not shown). A pair of safety chains 38, as well as a caster wheel 40 are also bolted to the front of the center frame member 22. The pair of safety chains 38 are utilized to connect the lightweight combination boat trailer and lift 10 to the towing vehicle as a safety measure in case the trailer hitch 36 separates from the towing vehicle. The caster wheel 40 is adjustably secured perpendicular to the center frame member 22 and allows the lightweight combination boat trailer and lift 10 to be maneuvered around on land when the trailer hitch 36 is not coupled to the towing vehicle.

To ensure that the lightweight combination boat trailer and lift 10 is visible while carrying and transporting the boat, various light assemblies are mounted to the lightweight support frame 12. A pair of side marker lights 42 are mounted on the first side frame member 14 and the second side frame member 16 and a set of rear marker lights 44 are mounted to the rear frame member 18. A pair of light assemblies 46 are mounted to a pair of fenders 48 and contain running lights, brake lights, side marker lights, and turn signal indicators. A wire harness (not shown) connects the various light assemblies with connector 50. The connector 50 is utilized to connect the various light assemblies to the towing vehicle.

The boat (not shown) is guided and positioned upon the lightweight support frame 12 by a pair of rearward pivotable guide members 52 bolted to the rear frame member 18 and a pair of center rollers 54 bolted to the center frame member 22. The boat is positioned upon the rearward pivotable guide members 52 and the center rollers 54 by a guide winch 56. The guide winch 56 is bolted to the center frame member 22 via a perpendicular frame member 58. The guide winch 56 contains an extendable cable 60 and a hook 62 which is connected to the boat and used to draw the boat upon the rearward pivotable guide members 52 and center rollers 54 as the guide winch 56 is engaged.

In the embodiment shown in FIGS. 1-3C, a first adjustable support leg 64, a second adjustable support leg 66 and a third adjustable support leg 68 are used in conjunction with a cable and winch assembly 70 to elevate and lower the lightweight support frame 12. The adjustable support legs 64, 66 and 68 are each adjustably secured perpendicular to the lightweight support frame 12 by leg support tubes 72, 74 and 76, preferably by welded seams 78. Foot members 80, 82 and 84 are rigidly secured to a first end of each adjustable support leg 64, 66 and 68. The foot members 80, 82 and 84 offer stability and support as the adjustable support legs 64, 66 and 68 sustain the weight of the lightweight support frame 12 carrying the boat (not shown) above a body of water. The foot members 80, 82 and 84 can also be pivotably secured to the adjustable support legs 64, 66 and 68 to compensate for any irregularities in the surface floor beneath the body of water. Moreover, one skilled in the art would readily recognize that the foot members 80, 82 and 84 can also be attached to telescoping leg extension members adjustably pinned to the adjustable support legs 64, 66 and 68 to maintain the boat level with the water when the surface floor beneath the body of water is uneven or excessively deep where docking occurs.

The cable and winch assembly 70 includes a first cable 86, a second cable 88, a third cable 90, and a winch 92 having a rotating handle 94. The first cable 86 is connected to an eyebolt 96, which is preferably bolted to the first end of the first adjustable support leg 64. The first cable 86 is then routed over a double pulley 98, parallel along the first side frame member 14, under a double pulley 100 and connected to an eyebolt 102 which is bolted to a second end of the second adjustable support leg 66. The second cable 88, shown more clearly in FIG. 2, is connected to an eyebolt 104 which is bolted to a second end of the first adjustable support leg 64. The second cable 88 is then routed under the double pulley 98, parallel along the first side frame member 14, under the double pulley 100, wrapped around a drum 106 of the winch 92, under a single pulley 108, mounted to a first end of a second adjustable support leg 66, over a double pulley 110, parallel along the second side frame member 16, over a double pulley 112 and connected to an eyebolt 114 which is bolted to the first end of the third adjustable support leg 68. The third cable 90, shown clearly as a dashed line in FIG. 2, is connected to an eyebolt 116 which is bolted to a second end of the third adjustable support leg 68, routed under the double pulley 112, parallel along the second side frame member 16, over the double pulley 110 and connected to an eyebolt 118 which is bolted to the first end of the second adjustable support leg 66.

Figure 3B:
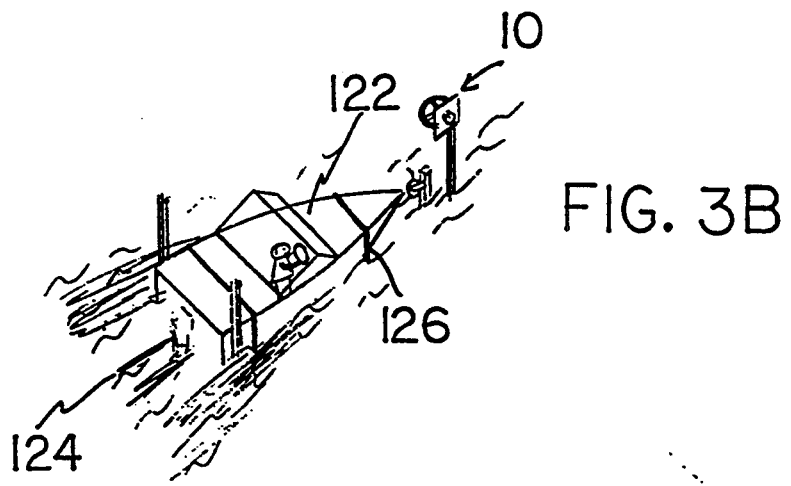
FIG. 3B is a perspective view of the embodiment of FIG. 1 shown attached to the boat and being maneuvered about a body of water in a floatable manner.
Figure 3C:
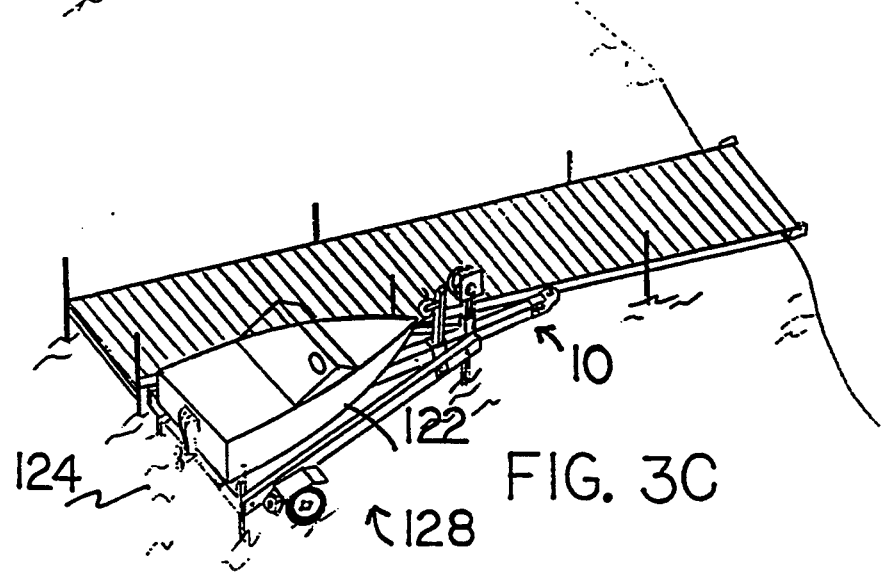
FIG. 3C is a perspective view of the embodiment of FIG. 1 shown elevated above the body of water for docking or storage.

Referring to FIGS. 3A-3C, in operation, a towing vehicle 120 will position and guide the lightweight combination boat trailer and lift 10 carrying a boat 122 into a body of water 124. Once the boat 122 is positioned within the body of water 124, the lightweight combination boat trailer and lift 10 is disconnected from the towing vehicle 120 at trailer hitch 36. This enables the boat 122 which is detachably secured to the lightweight combination boat trailer and lift 10 with support straps 126 to maneuver the attached lightweight combination boat trailer and lift 10 in a floatable manner to a suitable docking location 128, shown clearly in FIG. 3B.

Once positioned at the docking location 128, the winch 92 which is geared to provide mechanical advantage, is utilized to easily elevate the lightweight support frame 12 carrying the boat 122 by turning the rotating handle 94 in a counterclockwise direction, shown by arrow 130. This essentially causes the drum 106 to turn clockwise, causing the second cable 88 to pull the first side frame member 14 up in relation to the first adjustable support leg 64 and the second adjustable support leg 66. This allows the second side frame member 16 to rise unrestricted as the third adjustable support leg 68 is pulled down by the third cable 90 at substantially the same rate as the first adjustable support leg 64 and the second adjustable support leg 66. As the adjustable support legs 64, 66 and 68 are lowered with the cable and winch assembly 70, the lightweight support frame 12 carries the boat 122 above the body of water 124, shown clearly in FIG. 3C. This allows the boat 122 to be docked and stored in a safe manner similar to a conventional boat lift (not shown).

Once it is desired to launch the boat 122 or to move the lightweight combination boat trailer and lift 10 to a new docking location, the rotating handle 94 is turned in a clockwise direction. This essentially causes the second cable 88 to pull the second side frame member 16 down in relation to the third adjustable support leg 68 and the second adjustable support leg 66. This allows the first side frame member 14 to fall freely as the first adjustable support leg 64 is pulled up with the first cable 86 at substantially the same rate as the third adjustable support leg 68 and the second adjustable support leg 66. As the lightweight support frame 12 carrying the boat 122 is lowered into the body of water 124, the boat 122 can either float free from the lightweight combination boat trailer and lift 10 or, if the support straps 126 are engaged and the adjustable support legs 64, 66, and 68 are fully raised, the boat 122 can maneuver the lightweight combination boat trailer and lift 10 in a floatable manner about the body of water 124, shown clearly in FIG. 3B.

Figure 4:
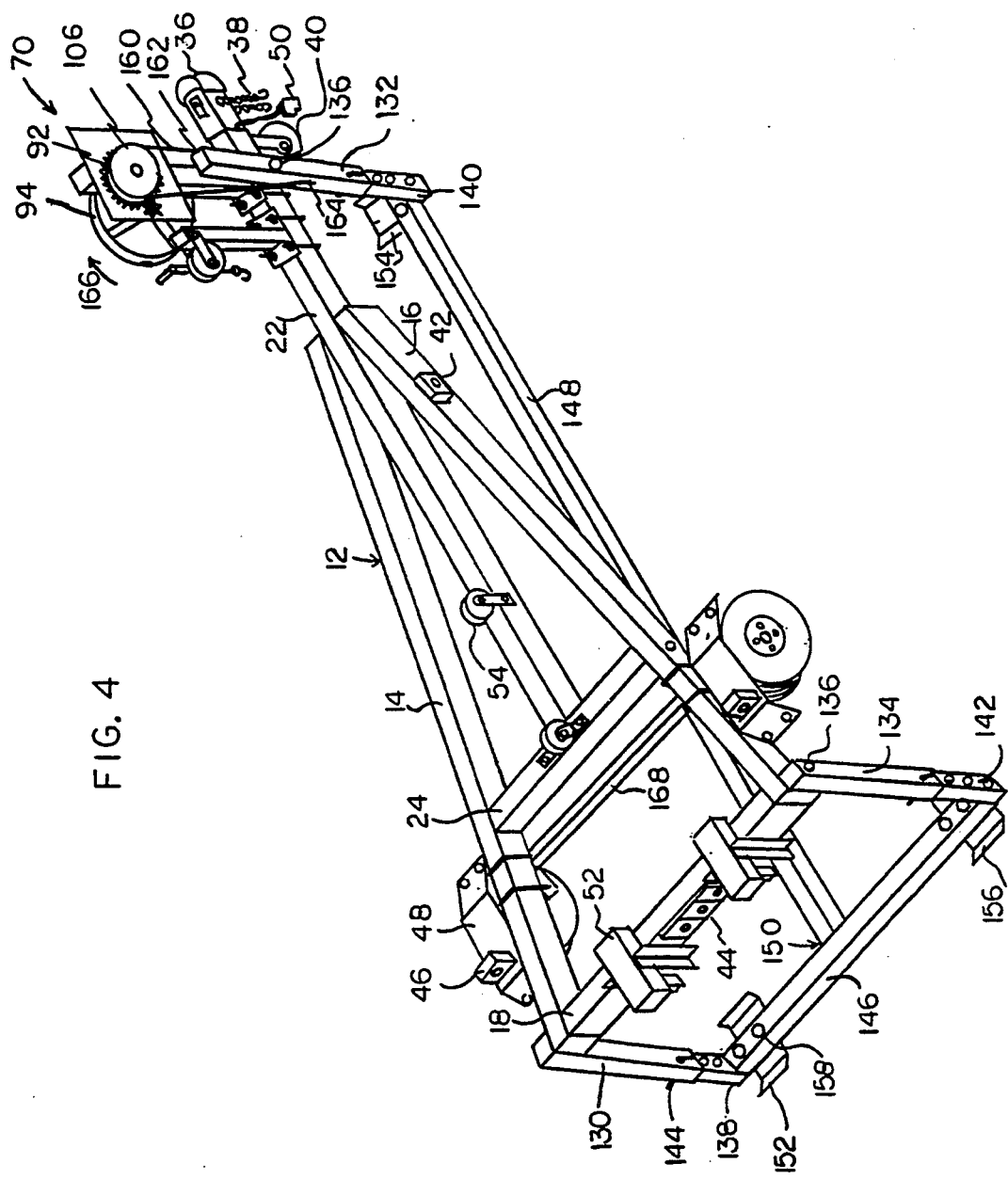
FIG. 4 is a perspective view of another preferred embodiment of the present invention.

In another preferred embodiment, shown clearly in FIG. 4, a first adjustable support leg 130, a second adjustable support leg 132 and a third adjustable support leg 134 are used in conjunction with the cable and winch assembly 70 to elevate and lower the lightweight support frame 12. The adjustable support legs 130, 132 and 134 are each adjustably secured to the lightweight support frame 12 by pivot pins 136. A first telescoping leg extension member 138, a second telescoping leg extension member 140, and a third telescoping leg extension member 142 are each adjustably pinned to the adjustable support legs 130, 132 and 134 through adjustable pins 144. The telescoping leg extension members 138, 140 and 142 are each pivotably attached by pivot pins 136 to a first member 146 and a second member 148 which allows the adjustable support legs 130, 132 and 134 to be simultaneously moved in the same direction. The second member 148 is rigidly secured perpendicular to the first member 146 preferably by a welded seam 150. Foot members 152, 154 and 156 are each secured to the first member 146 or the second member 148 by bolts 158, adjacent to the telescoping leg extension members 138, 140 and 142. However, one skilled in the art would also recognize that the foot members 152, 154 and 156 can also be pivotably secured to the first member 146 or the second member 148. The cable and winch assembly 70 utilizes a single cable 160. The cable 160 is connected to an eyebolt 162, which is preferably bolted to the upper portion of the adjustable support leg 132. The cable 160 is then wrapped around the drum 106 of the winch 92 and connected to an eyebolt 164 which is bolted to the lower portion of the adjustable support leg 132.

Turning the rotating handle 94 in a clockwise direction, shown by arrow 166, causes the drum 106 to turn counterclockwise, which causes the cable 160 to move the upper portion of the adjustable support leg 132 upward (counterclockwise) as the adjustable support leg 132 pivots at pivot point 168 through pivot pin 136. This causes the adjustable support legs 130, 132 and 134 to be pivoted substantially perpendicular to the lightweight support frame 12 thereby allowing the lightweight support frame 12 to carry the boat 122 (not shown) above the body of water 124 similar to that shown in FIG. 3C. Turning the rotating handle 94 in a counterclockwise direction causes the drum 106 to turn clockwise which causes the lower portion of the adjustable support leg 132 to be pulled upward (clockwise) as it pivots at pivot point 168 through pivot pin 136. As this occurs, the adjustable support legs 130, 132 and 134 are simultaneously pivoted in a clockwise direction causing the lightweight support frame 12 to carry the boat 122 into the body of water. It should be noted that a torsion axle 168 is utilized in the embodiment to eliminate leaf springs 34. This is done to provide more clearance for the second member 148 as the adjustable support legs are pivoted in a clockwise direction. If the adjustable support legs 130, 132 and 134 are fully pivoted and the boat 122 is secured to the lightweight support frame 12 by support straps 126, the boat 122 can maneuver the lightweight combination boat trailer and lift 10 in a floatable manner to a suitable docking location, similar to that shown in FIG. 3B. This also allows the towing vehicle 120 to maneuver the boat 122 on land, as shown similarly in FIG. 3A.

The foregoing discussion discloses and describes merely exemplary embodiments of the present invention. One skilled in the art will readily recognize from such discussion, and from the accompanying drawings and claims, and various changes, modifications, and variations can be made therein without departing from the spirit and scope of the invention as defined in the following claims.

What is claimed is:

1. A lightweight combination boat trailer and lift for transporting a boat and elevating the boat above a body of water, said lightweight combination boat trailer and lift comprising:

a lightweight support frame for carrying the boat during transporting and elevating, said lightweight support frame including positioning members to position the boat upon the lightweight support frame, wherein the boat is detachably positioned on the lightweight support frame;

an axle and hitch assembly, said axle and hitch assembly secured to the lightweight support frame to enable the lightweight support frame to be transported on wheels rotatably attached to the axle assembly;

at least three adjustable support legs, said adjustable support legs adjustably secured to the lightweight support frame; and elevating means for elevating the lightweight support frame, said elevating means including three cables and a winch assembly, said cables and winch assembly operable to simultaneously move the adjustable support legs either upward or downward in a same direction, wherein the adjustable support legs are moved downward so that the lightweight support frame is elevated upward to carry the boat above the body of water or wherein the adjustable support legs are moved upward above a plane parallel with the wheels so that the lightweight support frame is lowered downward to carry the boat into the body of water to either enable the boat to float free from the lightweight support frame or to enable the boat to maneuver the lightweight combination boat trailer and lift in a floatable manner about the body of water.

2. The lightweight combination boat trailer and lift as defined in claim 1 wherein the lightweight support frame is substantially triangular in shape and contains at least one support strap to detachably secure the boat to the lightweight support frame.

3. The lightweight combination boat trailer and lift as defined in claim 2 wherein the lightweight support frame further includes at least three leg support tubes positioned at substantially the corners of the lightweight support frame, wherein the adjustable support legs are adjustably secured within the leg support tubes to maintain the adjustable support legs substantially perpendicular to the lightweight support frame.

4. The lightweight combination boat trailer and lift as defined in claim 1 wherein the lightweight support frame is constructed of aluminum.

5. The lightweight combination boat trailer and lift as defined in claim 1 wherein each adjustable support leg has an elongated tubular shape.

6. The lightweight combination boat trailer and lift as defined in claim 1 wherein each adjustable support leg has an elongated rectangular shape.

7. The lightweight combination boat trailer and lift as defined in claim 1 wherein each adjustable support leg has a leg extension member adjustably secured to a first end of each adjustable support leg.

8. The lightweight combination boat trailer and lift as defined in claim 1 wherein a foot member is rigidly secured to a first end of each adjustable support leg.

9. The lightweight combination boat trailer and lift as defined in claim 1 wherein a foot member is pivotally secured to a first end of each adjustable support leg.

10. The lightweight combination boat trailer and lift as defined in claim 1 wherein the three cables and winch assembly includes:

a first cable secured to a first end of a first adjustable support leg, routed parallel to a first side frame member and secured to a second end of a second adjustable support leg;

a second cable secured to a second end of the first adjustable support leg, routed parallel to the first side frame member, wrapped around the winch assembly mounted on the second adjustable support leg, routed parallel to a second side frame member and secured to a first end of a third adjustable support leg; and a third cable secured to a second end of the third adjustable support leg, routed parallel to the second side frame member and secured to a first end of the second adjustable support leg, 11. The lightweight combination boat trailer and lift as defined in claim 1 wherein the adjustable support legs further includes:

a first adjustable support leg adjustably secured to the lightweight support frame to enable the first adjustable support leg to pivot at a second end of the first adjustable support leg, said first adjustable support leg including a first leg extension member adjustably secured to a first end of the first adjustable support leg;

a second adjustable support leg adjustably secured to the lightweight support frame to enable the second adjustable support leg to pivot at a second end of the second adjustable support leg, said second adjustable support leg including a second leg extension member adjustably secured to a first end of the second adjustable support leg; and a third adjustable support leg adjustably secured to the lightweight support frame to enable the third adjustable support leg to pivot at a second end of the third adjustable support leg, said third adjustable support leg including a third leg extension member adjustably secured to a first end of the third adjustable support leg.

12. The lightweight combination boat trailer and lift as defined in claim 11 wherein the elevating means further includes:

a first member having a first end and a second end, said first member pivotably secured at the first end to the first leg extension member and pivotably secured at the second end to the third leg extension member; and a second member having a first end and a second end, said second member rigidly secured perpendicular to the first member at the first end of the second member and pivotally secured at the second end of the second member to the second leg extension member.

13. The lightweight combination boat trailer and lift as defined in claim 12 wherein the cable and winch assembly further includes at least one of said cables secured substantially adjacent to the second end of the second adjustable support leg, wrapped around the winch assembly and secured adjacent to the first end of the second adjustable support leg.

14. A lightweight combination boat trailer and lift for transporting a boat and elevating the boat above a body of water, said lightweight combination boat trailer and lift comprising:
- a lightweight support frame having a substantially triangular shape for carrying the boat during transporting and elevating, said lightweight support frame including positioning members to position the boat upon the lightweight support frame, wherein the boat is detachably positioned on the lightweight support frame;
- an axle and hitch assembly, said axle and hitch assembly secured to the lightweight support frame to enable the lightweight support frame to be transported on wheels rotatably attached to the axle assembly;
- three adjustable support legs, said adjustable support legs adjustably secured at substantially each corner of the lightweight support frame; and
- cable and winch assembly for elevating the lightweight support frame, said cable and winch assembly having three cables secured to the adjustable support legs to simultaneously move the adjustable support legs either upward or downward in a same direction, wherein the adjustable support legs are moved downward so that the lightweight support frame is elevated upward to carry the boat above the body of water or wherein the adjustable support legs are moved upward above a plane parallel with the wheels so that the lightweight support frame is lowered downward to carry the boat into the body of water to either enable the boat to float free from the lightweight support frame or to enable the boat to maneuver the lightweight combination boat trailer and lift in a floatable manner about the body of water.

15. A method of transporting a boat and elevating the boat above a body of water using a lightweight combination boat trailer and lift having a lightweight support frame, an axle and hitch assembly, at least three adjustable support legs and an elevating device including a cable and winch assembly for elevating the lightweight support frame, said method comprising the steps of:
- providing the lightweight support frame for carrying the boat during transporting and elevating;
- attaching the axle and hitch assembly to the lightweight support frame to enable the lightweight support frame to be transported on wheels rotatably attached to the axle assembly;
- adjustably securing the at least three adjustable support legs to the lightweight support frame; and
- attaching the elevating device to the lightweight support frame and the adjustable support legs to simultaneously move the adjustable support legs either upward or downward in one direction, wherein the adjustable support legs are moved downward to elevate the lightweight support frame upward carrying the boat above the body of water or wherein the adjustable support legs are moved upward above a plane parallel with the wheels to lower the lightweight support frame downward carrying the boat into the body of water to either enable the boat to float free from the lightweight support frame or to enable the boat to maneuver the lightweight support frame in a floatable manner about the body of water.

16. The method as defined in claim 15 further comprising the steps of:
- connecting at least one support strap to the lightweight support frame to detachably secure the boat to the lightweight support frame;
- connecting the lightweight support frame to a towing vehicle;
- positioning the lightweight support frame carrying the boat into the body of water;
- disconnecting the lightweight support frame carrying the boat from the towing vehicle;
- maneuvering the boat and the lightweight support frame attached to the boat to a docking location; and
- elevating the lightweight support frame carrying the boat above the body of water.

* * * * *